United States Patent
Tae et al.

(10) Patent No.: US 9,007,359 B2
(45) Date of Patent: Apr. 14, 2015

(54) DISPLAY DEVICE HAVING INCREASED APERTURE RATIO

(75) Inventors: Seung-Gyu Tae, Yongin (KR); Sang-Jin Park, Yongin (KR)

(73) Assignee: Samsung Mobile Display Co., Ltd., Yongin, Gyeoggi-Do (KR)

( * ) Notice: Subject to any disclaimer, the term of this patent is extended or adjusted under 35 U.S.C. 154(b) by 893 days.

(21) Appl. No.: 13/030,591

(22) Filed: Feb. 18, 2011

(65) Prior Publication Data

US 2011/0221731 A1 Sep. 15, 2011

(30) Foreign Application Priority Data

Mar. 10, 2010 (KR) .................. 10-2010-0021378

(51) Int. Cl.
  G06F 3/038 (2013.01)
  G09G 5/00 (2006.01)
  G02F 1/1362 (2006.01)
  G09G 3/36 (2006.01)

(52) U.S. Cl.
  CPC ........ *G02F 1/136213* (2013.01); *G09G 3/3659* (2013.01); *G09G 3/3677* (2013.01); *G09G 2300/0465* (2013.01); *G09G 2300/0866* (2013.01); *G09G 2310/08* (2013.01); *G09G 2330/021* (2013.01)

(58) Field of Classification Search
  None
  See application file for complete search history.

(56) References Cited

U.S. PATENT DOCUMENTS

| | | | | |
|---|---|---|---|---|
| 4,928,095 A | * | 5/1990 | Kawahara | 345/93 |
| 5,398,043 A | * | 3/1995 | Takeda et al. | 345/94 |
| 5,923,310 A | * | 7/1999 | Kim | 345/90 |
| 2001/0033266 A1 | | 10/2001 | Lee | |
| 2002/0015017 A1 | * | 2/2002 | Kwag | 345/89 |
| 2002/0039089 A1 | * | 4/2002 | Lim | 345/87 |
| 2003/0007108 A1 | * | 1/2003 | Hwang et al. | 349/43 |
| 2003/0063074 A1 | * | 4/2003 | Kumagawa et al. | 345/204 |
| 2004/0032385 A1 | * | 2/2004 | Park et al. | 345/95 |
| 2004/0150610 A1 | * | 8/2004 | Zebedee et al. | 345/100 |
| 2004/0239602 A1 | * | 12/2004 | Kim et al. | 345/87 |
| 2005/0219187 A1 | | 10/2005 | Shih | |
| 2006/0202929 A1 | * | 9/2006 | Baum et al. | 345/89 |
| 2008/0001900 A1 | * | 1/2008 | Park | 345/100 |
| 2008/0036934 A1 | * | 2/2008 | Um et al. | 349/38 |
| 2008/0122829 A1 | * | 5/2008 | Park | 345/213 |
| 2009/0002355 A1 | * | 1/2009 | Iwatsu | 345/205 |
| 2009/0086116 A1 | * | 4/2009 | Pak | 349/38 |
| 2009/0102820 A1 | * | 4/2009 | Chen et al. | 345/204 |
| 2009/0109356 A1 | | 4/2009 | Kitagawa | |
| 2009/0262058 A1 | * | 10/2009 | Pak et al. | 345/92 |
| 2010/0006783 A1 | * | 1/2010 | Kwon et al. | 250/551 |

(Continued)

FOREIGN PATENT DOCUMENTS

| | | |
|---|---|---|
| CN | 101436368 A | 5/2009 |
| CN | 101546082 A | 9/2009 |

(Continued)

OTHER PUBLICATIONS

Chinese Office Action dated Jun. 3, 2014 of corresponding Chinese Patent Application No. 201110045942.8—6 pages.

*Primary Examiner* — Antonio Xavier
(74) *Attorney, Agent, or Firm* — Knobbe, Martens, Olson & Bear LLP (57) ABSTRACT

A display device having active level shift (ALS) lines and ALS drivers connected to the ALS lines removed from the display device, and a gate line at a rear end pixel area is used instead of the ALS line to obtain the effect of the ALS lines. Accordingly, a pixel aperture ratio may be increased and a width of an outer black matrix may be reduced.

17 Claims, 9 Drawing Sheets

(56) References Cited

U.S. PATENT DOCUMENTS

2010/0039453 A1* 2/2010 Chaji et al. .................... 345/690
2010/0171772 A1* 7/2010 Guan et al. .................... 345/690

FOREIGN PATENT DOCUMENTS

| | | | |
|---|---|---|---|
| CN | 101625834 A | 1/2010 |
| JP | 2005-292793 A | 10/2005 |
| JP | 2009-109657 A | 5/2009 |
| KR | 2000-0022668 A | 4/2000 |
| KR | 0658063 B1 | 12/2006 |
| KR | 10-2007-0066013 A | 6/2007 |
| KR | 2007-0122000 A | 12/2007 |
| TW | 200534218 A | 10/2005 |

* cited by examiner

DISPLAY DEVICE HAVING INCREASED APERTURE RATIO

CROSS-REFERENCE TO RELATED APPLICATION

This application claims the benefit of Korean Patent Application No. 10-2010-0021378, filed on Mar. 10, 2010, in the Korean Intellectual Property Office, the disclosure of which is incorporated herein by reference.

BACKGROUND

1. Field

An aspect of the present invention relates to a display device, and more particularly, to a display device having an increased aperture ratio and an external black matrix with a reduced width.

2. Description of the Related Art

Liquid crystal display (LCD) devices are light-weight, thin, and function under low driving power consumption, and thus are widely used as a display device for laptop computers or portable televisions (TV).

The LCD displays a desired image on a screen by adjusting a transmission amount of light according to a signal applied to multiple control switches that are arranged in a matrix.

Figure 1:
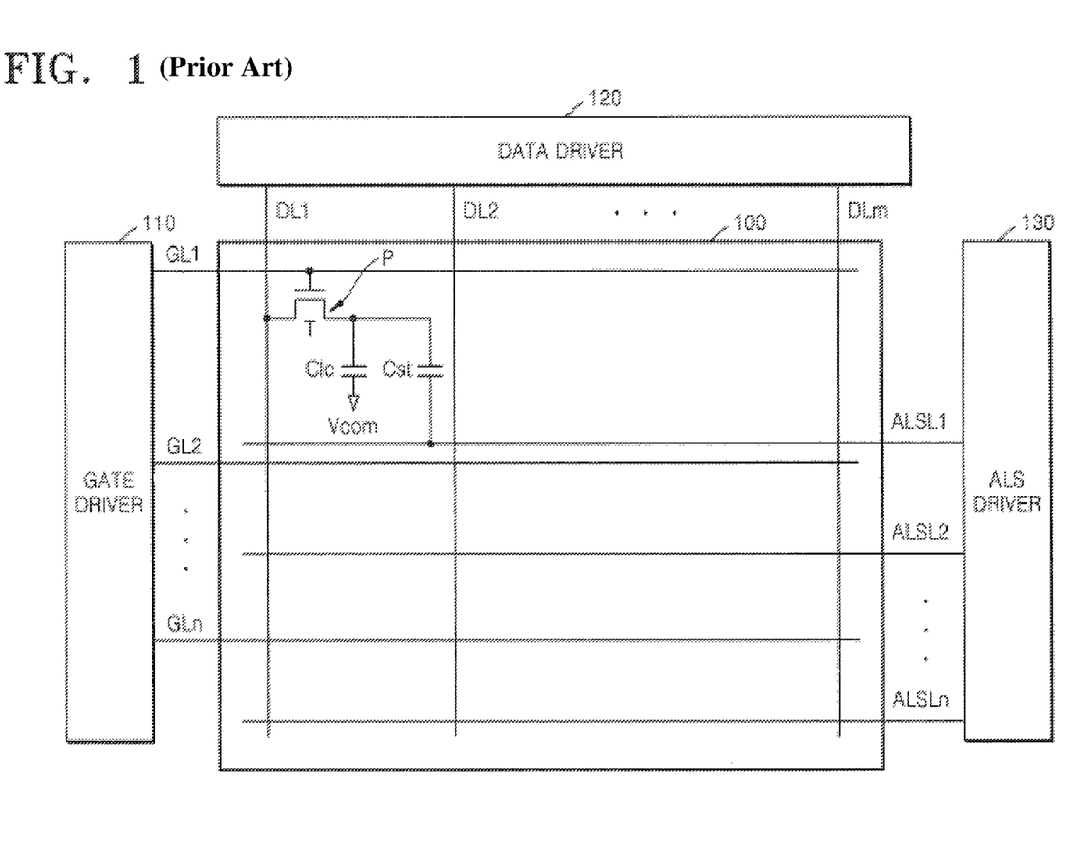
FIGS. 1 and 2 are each a circuit diagram and a plan view of a liquid crystal panel of a conventional liquid crystal display (LCD) device.
Figure 2:
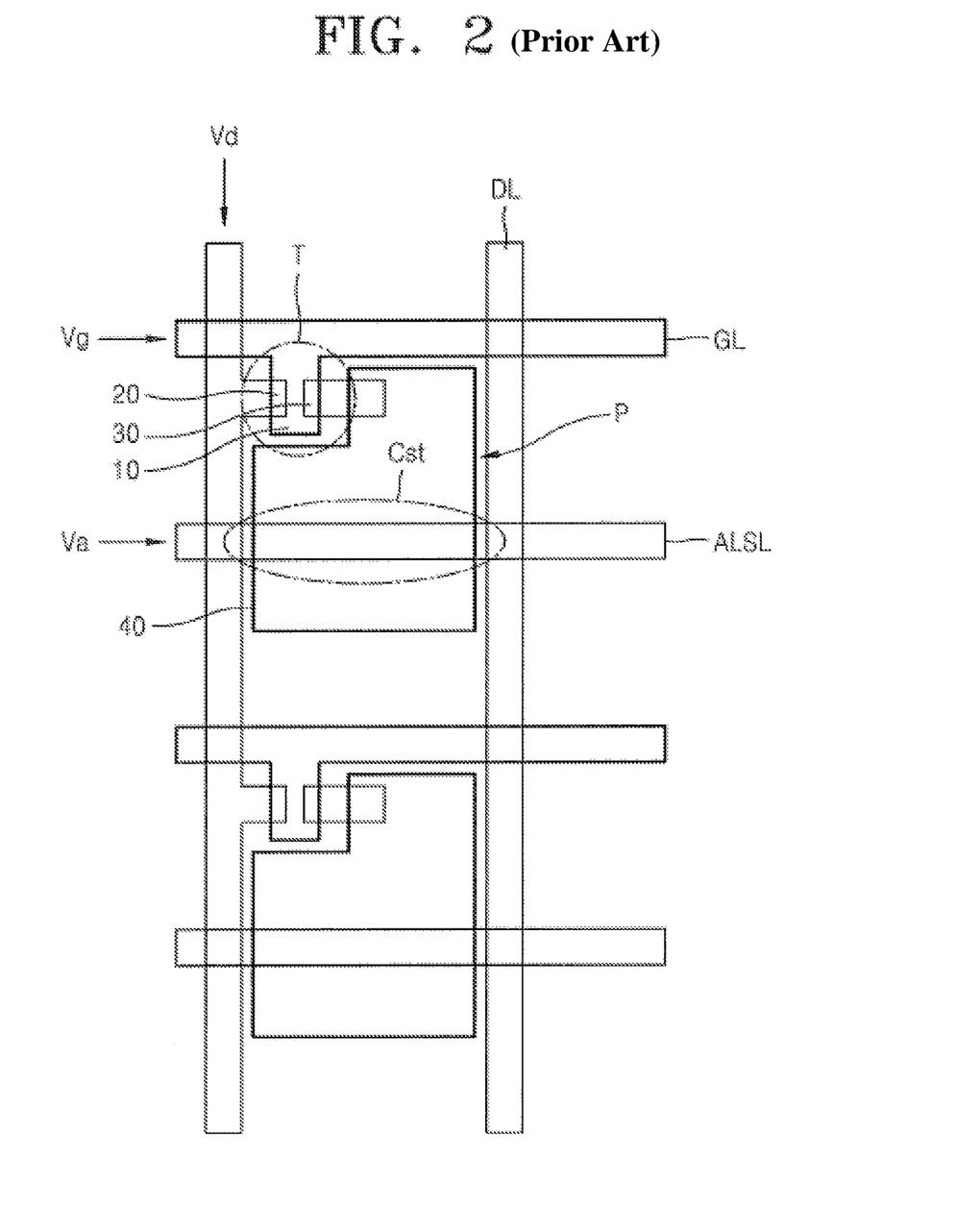

FIGS. 1 and 2 are plan views illustrating a structure of a liquid crystal panel 100 in a conventional LCD.

Referring to FIGS. 1 and 2, the liquid crystal panel 100 includes a plurality of pixel areas P formed of a plurality of gate lines GL1 through GLn and a plurality of data lines DL1 through DLm. Each pixel area P includes a thin film transistor (TFT) T, a liquid crystal capacitor Clc, and a storage capacitor Cst.

In the TFT T, a gate electrode 10 is connected to the gate lines GL1 through GLn, a source electrode 20 is connected to the data lines DL through DLm, and a drain electrode 30 is connected to a pixel electrode 40.

The liquid crystal capacitor Clc is connected to the TFT T and is driven by an electrical field between the pixel electrode 40 and a common electrode (not shown). The arrangement of liquid crystal particles in a liquid crystal layer of the liquid crystal capacitor Clc is changed by an electrical field when a common voltage is applied to a common voltage (Vcom) line so as to adjust the amount of light being transmitted or to block light.

The storage capacitor Cst is driven by a part of the pixel electrode 40 and a predetermined area of active level shift (ALS) lines ALSL1 through ALSLn that are parallel to the gate lines GL1 through GLn. An ALS driving unit 130 applies an ALS voltage Va to the ALS lines ALSL1 through ALSLn.

When a high gate voltage Vgh is applied to the gate electrode 10 of the TFT T to turn on the TFT T, and then a data voltage Vd is applied to the pixel electrode 40, the storage capacitor Cst is charged to a charge amount corresponding to a voltage difference between the data voltage (pixel voltage) Vd and the ALS voltage Va. The charge amount in the storage capacitor Cst is supplied to the pixel electrode 40 that is floated while the TFT T is turned off as a low gate voltage Vgl is applied to the gate electrode 10 of the TFT T, thereby allowing the liquid crystals to be continuously driven.

In a single bank gate type liquid crystal panel as described above, a gate driver 110 for driving the pixel electrode 40 and an ALS driver 130 used to reduce power consumption are disposed in black matrix (BM) areas on left and right outer portions of the liquid crystal panel 100. In a double bank gate type liquid crystal panel, a gate driver 110 connected to odd-numbered gate lines on a left portion of an outer BM of the liquid crystal panel 100 and an ALS driver 130 connected to even-numbered ALS lines are included, and another gate driver 110 connected to even-numbered gate lines and another ALS driver 130 connected to odd-numbered ALS lines are disposed in a right portion of the outer BM.

Accordingly, as ALS lines are additionally formed, a pixel aperture ratio is low and it is difficult to obtain a slim outer BM area. According to the conventional art, sizes of a storage capacitor, a data line, a gate line, and a TFT are reduced or these elements are made transparent to obtain a high aperture ratio. However, since a transparent electrode has a high electric resistance, signal delay is intensively generated when signals are transmitted via circuits.

SUMMARY

An aspect of the present invention provides a liquid crystal display (LCD) device with an increased pixel aperture ratio and a method of driving the LCD device.

According to another aspect of the present invention, there is provided an LCD device having an outer black matrix with a reduced width and a method of driving the LCD device.

According to an aspect of the present invention, there is provided a display device including a panel comprising a plurality of pixel areas that are defined by a plurality of data lines and a plurality of gate lines that cross each other; a data driver that is connected to the plurality of data lines and applies a data signal to the data lines; and a gate driver that is connected to the plurality of gate lines, sequentially supplies a gate signal to the gate lines, and selects one of a first gate-low voltage and a second gate-low voltage in an off period of a switching device in the plurality of pixel areas and outputs the selected gate-low voltage.

The first gate-low voltage and the second gate-low voltage may boost a pixel voltage of a front end pixel area.

The first gate-low voltage and the second gate-low voltage may boost a pixel voltage at the front end in an off period of the switching device of the front end pixel area.

The first gate-low voltage and the second gate-low voltage may be alternately output for each frame.

The gate driver may include a low level signal selection unit that selects one of the first gate-low voltage and the second gate-low voltage and outputs the selected gate-low voltage.

According to another aspect of the present invention, the low level signal selection unit may be a multiplexer.

The panel may include the switching device that is connected to the data lines and the gate lines; a pixel electrode that is connected to the switching device, wherein a portion of the pixel electrode is overlapped with a gate line at a rear end pixel area; a liquid crystal capacitor that is formed between the pixel electrode and a common electrode facing the pixel electrode; and a storage capacitor that is formed between the pixel electrode and the gate line at the rear end pixel area.

The switching device may be a thin film transistor (TFT).

According to another aspect of the present invention, there is provided a display device including a plurality of data lines and a plurality of gate lines crossing each other to define a plurality of pixel areas of a panel; a TFT connected to the data line and the gate line; a pixel electrode that is connected to the TFT, wherein a portion of the pixel electrode is overlapped with a gate line at a rear end pixel area; a liquid crystal capacitor that is formed between the pixel electrode and a common electrode facing the pixel electrode; and a storage capacitor that is formed between the pixel electrode and the gate line at the rear end.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Reference will now be made in detail to the present embodiments of the present invention, examples of which are illustrated in the accompanying drawings, wherein like reference numerals refer to the like elements throughout. The embodiments are described below in order to explain the present invention by referring to the figures. Moreover, it is to be understood that where is stated herein that one film or layer is "formed on" or "disposed on" a second layer or film, the first layer or film may be formed or disposed directly on the second layer or film or there may be intervening layers or films between the first layer or film and the second layer or film. Further, as used herein, the term "formed on" is used with the same meaning as "located on" or "disposed on" and is not meant to be limiting regarding any particular fabrication process.

Figure 3A:
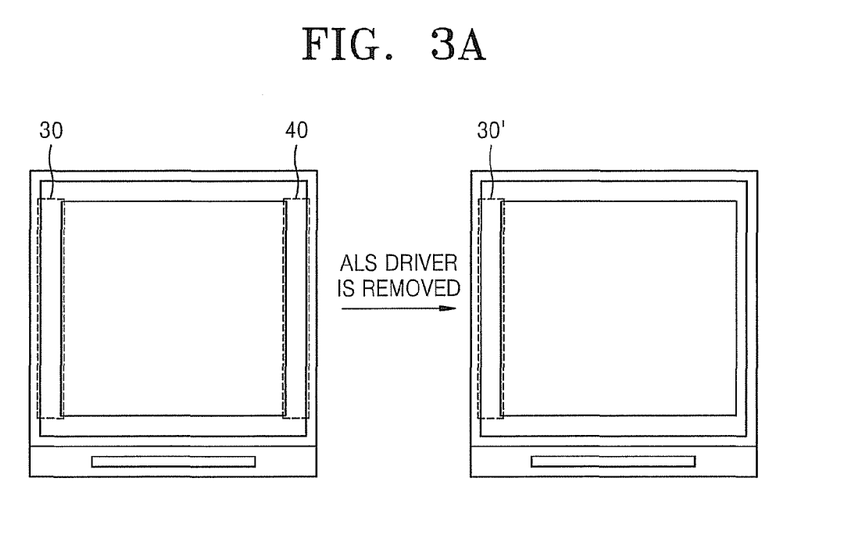
FIGS. 3A and 3B are schematic views illustrating an LCD device according to an embodiment of the present invention.
Figure 3B:
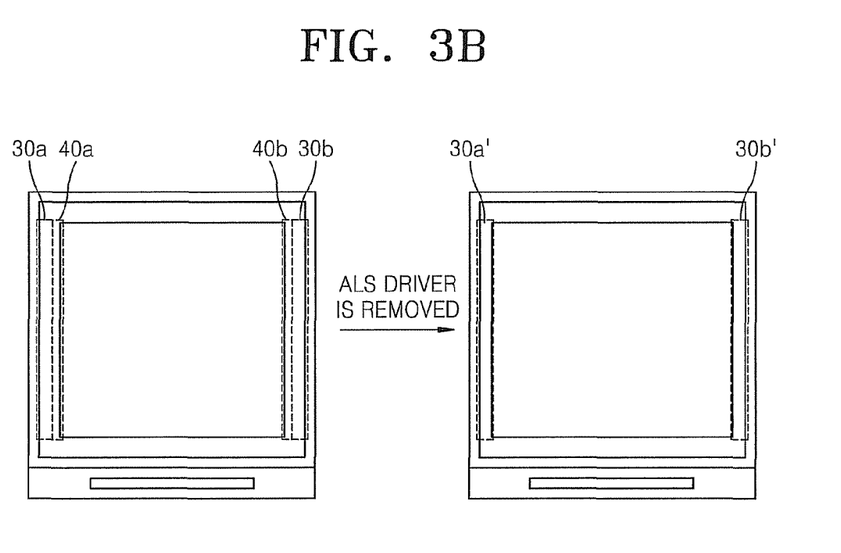

FIGS. 3A and 3B are schematic views illustrating a liquid crystal display (LCD) device according to an embodiment of the present invention.

Referring to FIGS. 3A and 3B, conventional LCD devices are illustrated on the left side, and LCD devices from which active level shift (ALS) drivers are removed according to an embodiment of the present invention, are illustrated on the right side.

Conventional LCD devices include a gate driver (30 and 30a/30b) and an ALS driver (40 and 40a/40b) on left and right portions of an outer black matrix. However, according to an embodiment of the present invention, the ALS driver (40 and 40a/40b) is removed and a gate driver 30' that also functions as the ALS driver (40 and 40a/40b) is included in an LCD device. The gate driver (30 and 30a'/30b') is designed to output two levels of a gate-low voltage, and alternately outputs gate-low voltages of different levels to gate lines for each frame during an off period of a thin film transistor (TFT). Accordingly, due to the gate-low voltage, a pixel voltage at a front end pixel area may be boosted by a predetermined level.

By removing the ALS driver (40 and 40a/40b) from the LCD device according to an embodiment of the present invention, a size of a liquid crystal panel is increased by reducing a width of outer black matrixes on left and right portions of the liquid crystal panel, and ALS lines connected to the ALS driver (40 and 40a/40b) may also be removed, and thus a pixel aperture ratio of pixels may also be increased.

Figure 4:
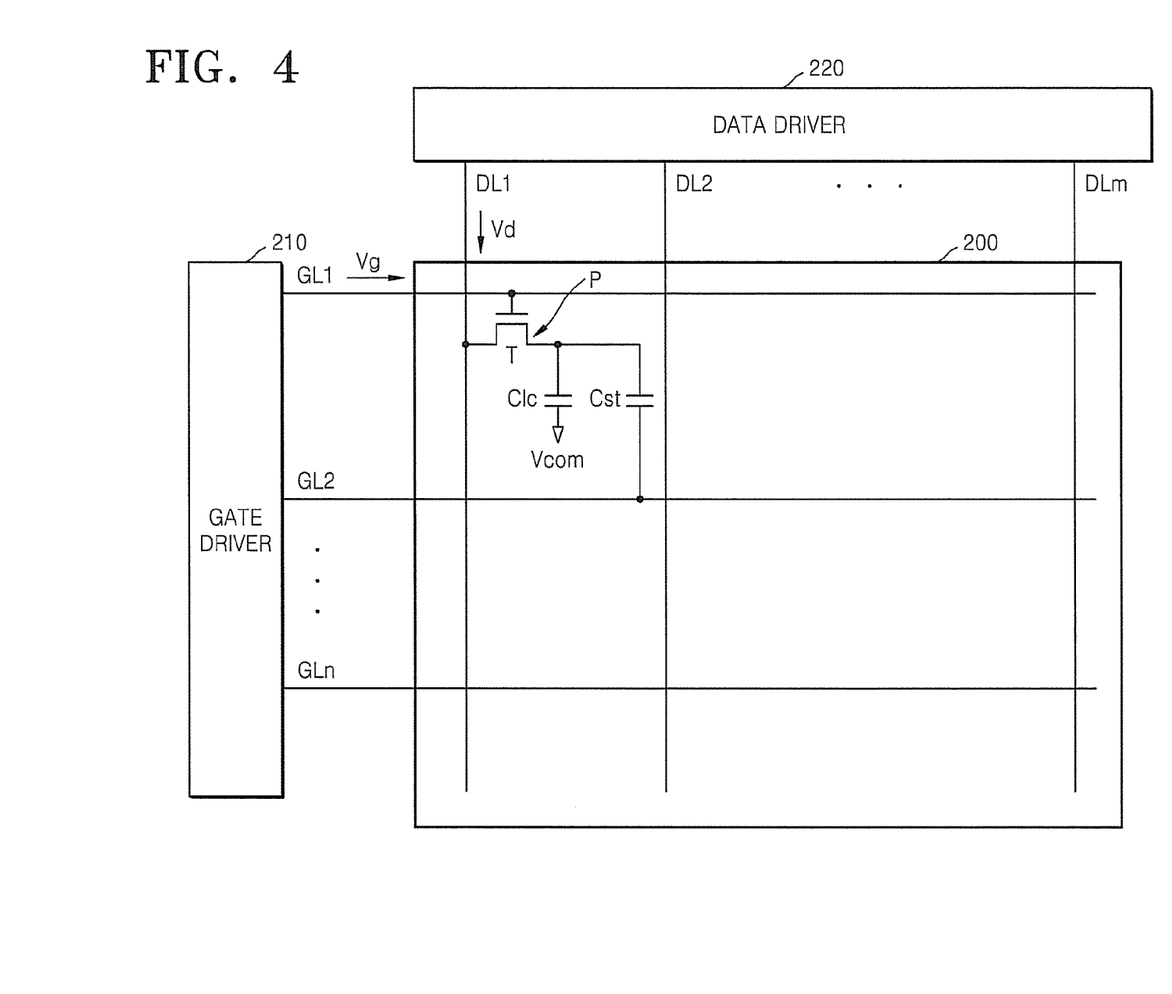
FIG. 4 is a circuit diagram illustrating a structure of a liquid crystal panel of an LCD device, according to an embodiment of the present invention.
Figure 5A:
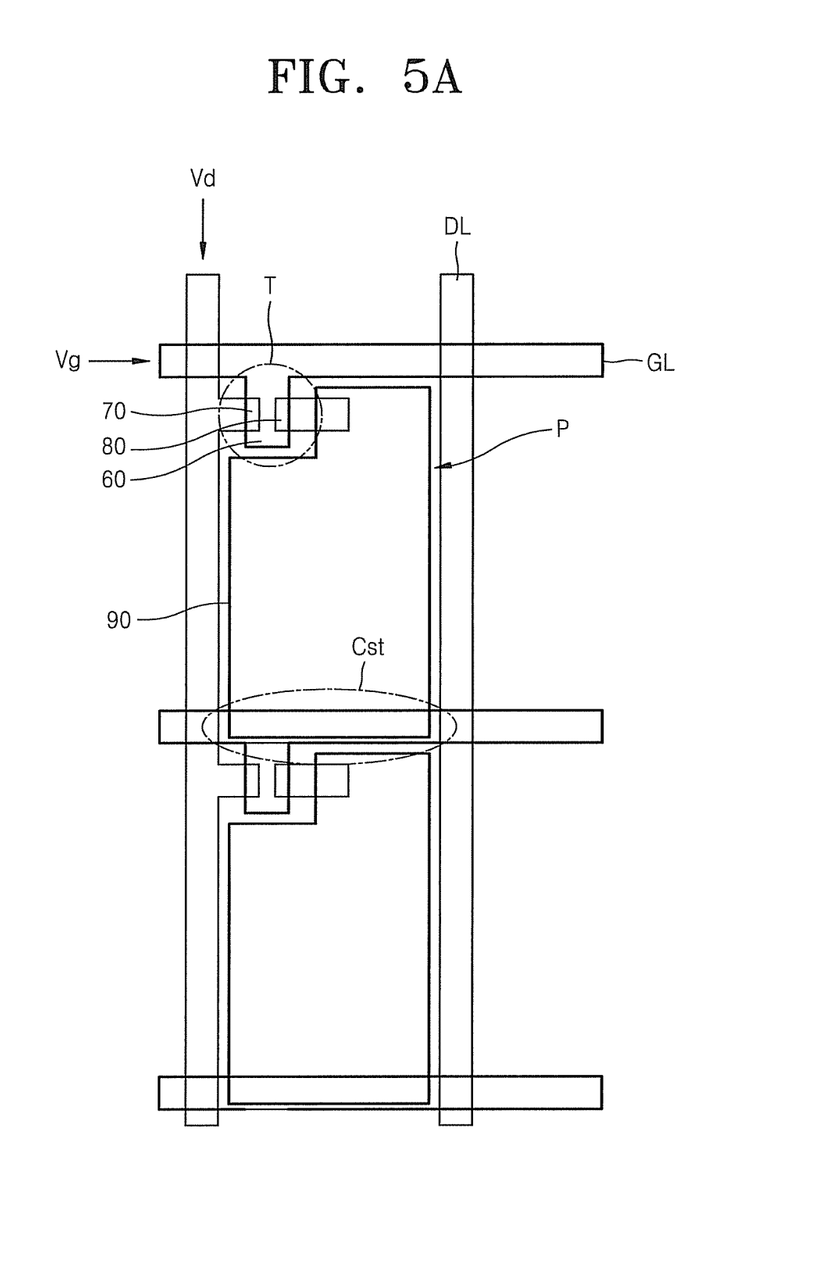
FIGS. 5A and 5B are plane views illustrating the liquid crystal panel of FIG. 4.
Figure 5B:
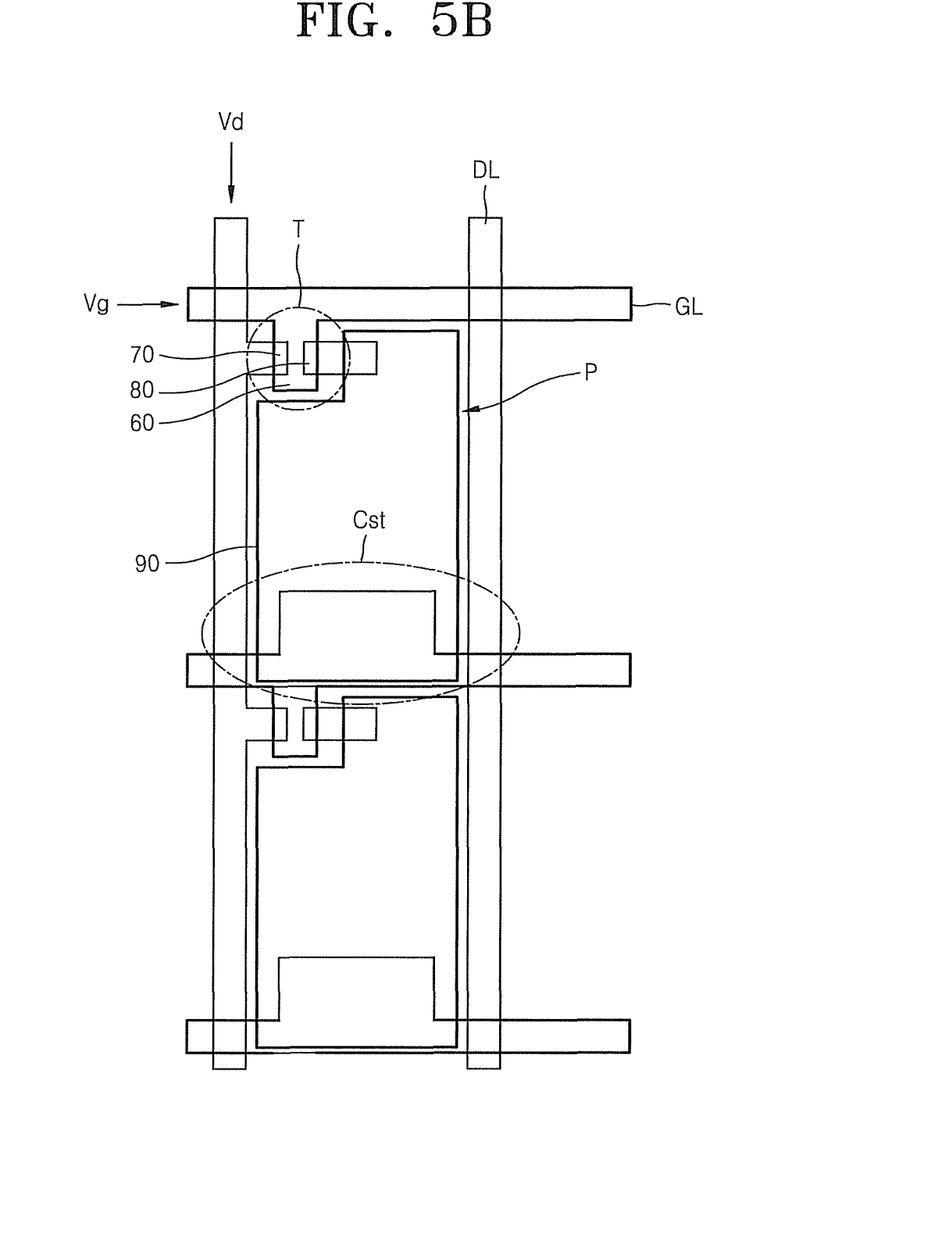

FIG. 4 is a circuit diagram illustrating a structure of a liquid crystal panel 200 of an LCD device according to an embodiment of the present invention. FIGS. 5A and 5B are plan views illustrating the liquid crystal panel 200.

Referring to FIGS. 4, 5A, and 5B, the liquid crystal panel 200 is formed of two substrates and a liquid crystal layer interposed between the two substrates. Data lines DL1 through DLm, gate lines GL1 through GLn, a TFT T, a liquid crystal capacitor Clc, and a storage capacitor Cst are formed on a first substrate of the liquid crystal panel 200. A black matrix BM, a color filter, and a common electrode are formed in a second substrate of the liquid crystal panel 200.

A gate driver 210 that applies a gate voltage Vg to the gate lines GL1 through GLn and a data driver 220 that applies a data voltage Vd to the data lines DL1 through DLm are included in an outer BM of the liquid crystal panel 200.

The gate driver 210 may generate gate signals having a gate voltage Vg comprised of a gate on voltage and a gate off voltage and sequentially supply the gate signals through the plurality of gate lines GL1 through GLn to the liquid crystal panel 200. The TFT T is turned on or off by the gate on/off voltage. The gate driver 210 selects one of a first gate-low voltage and a second gate-low voltage and outputs the same during an off period of the TFT T. The first gate-low voltage and the second gate-low voltage boost a pixel voltage at a front end pixel area P.

The data driver 220 may sequentially supply a data signal having a data voltage Vd to the liquid crystal panel 200 through the plurality of data lines DL1 through DLm.

The gate lines GL1 through GLn are separately arranged at predetermined distances in rows, and the data lines DL1 through DLm are separately arranged at predetermined distances in columns. The gate lines GL1 through GLn and the data lines DL1 through DLm are arranged in a matrix, and a pixel area P is formed in a portion where the gate lines GL1 through GLn and the data lines DL1 through DLm cross each other. The pixel area P is a smallest unit for forming a screen and is switched by a gate voltage Vg, and transmittivity of the pixel area P is determined by a data signal Vd.

The gate lines GL1 through GLn are extended in a direction from a first data line DL1 to an m-th data line DLm, and a gate voltage is sequentially applied to from a pixel area P that is electrically connected to the first data line DL1 to a pixel area that is electrically connected to the m-th data line.

The gate line GLn of an i-th pixel area functions as an ALS line of a (i−1)-th pixel area. A gate voltage Vg applied to the gate line GLn is periodically varied to either a gate-high voltage Vgh that turns on the TFT T or a gate-low voltage Vgl that turns off the TFT T. The gate-low voltage Vgl is set at different voltage levels, Vgl1 or Vgl2, and is alternately applied for each frame.

According to an embodiment of the present invention, by removing the ALS lines that are formed separately and parallel to the gate lines GL between the gate lines GL1 through GLn according to the conventional art, loss in aperture ratio due to the ALS lines formed in the pixel area P may be reduced.

Each of the pixel areas P includes a TFT T, a liquid crystal capacitor Clc, and a storage capacitor Cst.

In the TFT T, a gate electrode 60 is electrically connected to the gate line GL, a first electrode 70 (a drain electrode or a source electrode) is electrically connected to the data line DL, and a second electrode 80 (a source electrode or a drain electrode) is electrically connected to a pixel electrode 90. The TFT T is turned on as a gate-high voltage Vgh is applied to the gate electrode 60, thereby transmitting a data voltage Vd applied from the data lines DL1 through DLm to the pixel electrode 90.

The liquid crystal capacitor Clc is formed by the pixel electrode 90 and the common electrode (not shown) in the pixel area P. A data voltage Vd that is supplied from the data driver 220 through the data line DL in response to a gate voltage Vg that is supplied from the gate driver 210 through the gate line GL, is applied to the pixel electrode 90, and a common voltage Vcom is applied to the common electrode, thereby forming an electrical field.

The storage capacitor Cst is formed between a portion of the pixel electrode 90 and the gate line GL of a rear end pixel area to maintain a charge voltage of the liquid crystal capacitor Clc while the TFT T is turned off. A portion of the pixel electrode 90 may be overlapped with a predetermined area of the gate line GL at the rear end pixel area as illustrated in FIG. 5A to form the storage capacitor Cst and may be separated from the gate line at the rear end pixel area using an insulating layer. Also, a portion of the pixel electrode 90 may be overlapped with the gate line GL at the rear end pixel area and an extended transparent electrode from the gate line GL at the rear end pixel area to form a storage capacitor Cst having a sufficient capacity as illustrated in FIG. 5B.

That is, the pixel electrode 90 receiving a signal from an i-th gate line GLi is formed to overlap with a predetermined area of a gate line GLi. For example, the pixel electrode 90 connected to the TFT T that is controlled by the first gate line GL1 is overlapped with a second gate line GL2, and the storage capacitor Cst connected to the TFT T is formed by the pixel electrode 90 and the second gate line GL2 connected to the TFT T.

A gate-low voltage applied to the gate line GLi+1 of the (i+1)-th pixel area is used as an ALS voltage for an i-th pixel area, and thus an i-th pixel voltage Vp is boosted to a predetermined level that is determined based on a gate-low voltage, thereby generating the same effect as an ALS circuit.

Accordingly, the liquid crystal panel 200 has a single bank gate structure. However, the liquid crystal panel 200 may also have a dual bank gate structure.

In the dual bank gate structure, a gate driver is disposed on each of left and right portions of the outer BM of the liquid crystal panel 200. An odd-numbered gate line through which a gate voltage is applied from the gate driver on one of the left and right portions is extended in a direction from a m-th data line Dm to a first data line D1, and an even-numbered gate line through which a gate voltage is applied from the gate driver on the other of the left and right portions is extended in a direction from the first data line D1 to the m-th data line Dm. Extension directions of the odd-numbered gate lines and the even-numbered gate lines may be opposite.

Like in the single bank gate structure, ALS lines that are parallel to gate lines according to the conventional art are removed and gate lines at the rear end pixel area are used as ALS lines of a corresponding pixel in the dual bank gate structure, and thus the ALS drivers on the left and right portions included together with the gate drivers on the left and right portions according to the conventional art are not necessary.

The gate driver generates a gate-low voltage to two different levels, and alternately output the two gate-low voltages for each frame. A gate-low voltage applied to a gate line GLi+1 of a (i+1)-th pixel area is used as an ALS voltage of an i-th pixel area, and accordingly, the i-th pixel voltage Vp is boosted to a predetermined voltage level, thereby generating the same effect as an ALS circuit.

FIGS. 6A-6D are timing diagrams illustrating a gate voltage applied to a gate line according to an embodiment of the present invention.

Figure 6A:
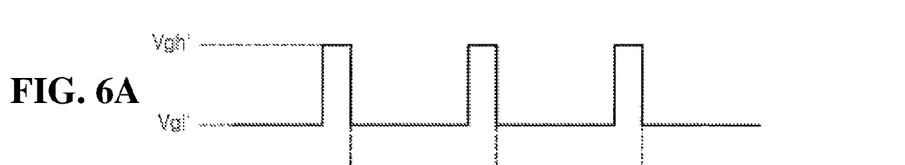
FIG. 6 is a timing diagram illustrating a gate voltage applied to a gate line, according to an embodiment of the present invention.
Figure 6B:
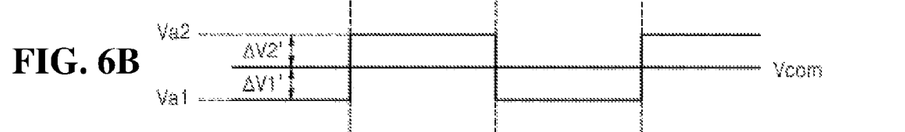

FIGS. 6A and 6B are timing diagrams of a gate voltage Vg' and an ALS voltage Va that are required to operate a conventional TFT T.

Referring to FIG. 6A, as the gate voltage Vg', a gate-high voltage Vgh' that turns on a TFT T and a gate-low voltage Vgl' that turns off a TFT T are alternately input. Referring to FIG. 6B, as the ALS voltage Va that is needed to maintain driving of the liquid crystals when the TFT T is turned off, voltages Va1 and Va2 of different voltage levels are alternately input each period, thereby having voltage differences $\Delta V1'$ and $\Delta V2'$ with respect to a common voltage Vcom. Accordingly, when the gate-high voltage Vgh' is applied to a gate line, the TFT T is turned on, and a data voltage is applied to a pixel electrode through a data line, and thus the pixel electrode has a pixel voltage Vp. When the gate-low voltage Vgl' is applied to a gate line, the TFT T is turned off, and when the pixel electrode is floated, the pixel electrode Vp is boosted by the ALS voltage, Va1 or Va2, that is applied through an ALS line, by $\Delta V1'$ or $\Delta V2'$ when the pixel electrode is floated.

Accordingly, the function of an ALS voltage applied through ALS lines that are additionally formed according to the conventional art is performed by varying a level of a gate-low voltage applied to a gate line at a rear end pixel area.

Figure 6C:
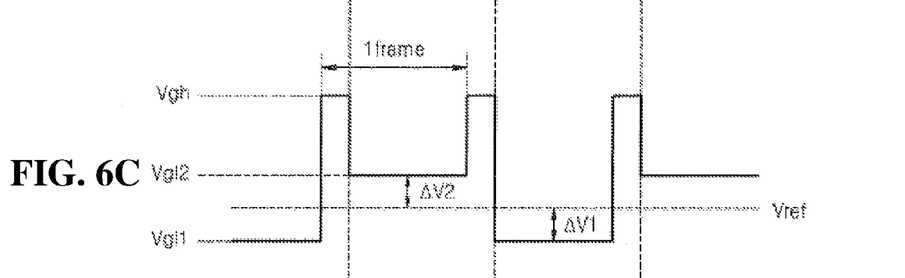

FIG. 6C is a timing diagram of a gate voltage Vg applied to a gate line according to an embodiment of the present invention. Referring to FIG. 6C, in each frame, a gate voltage Vg maintains a gate-high voltage Vgh during a period when the TFT T is turned on, and maintains a first gate-low voltage Vgl1 or a second gate-low voltage Vgl2 during a period when the TFT T is turned off. The first gate-low voltage Vgl1 and the second low voltage Vgl2 have different voltage levels and have a voltage difference $\Delta V1$ or $\Delta V2$ with respect to a reference voltage Vref. The reference voltage Vref may be set by a gate-high voltage Vgh and a gate-low voltage Vgl, and may be, for example, a common voltage Vcom. The voltage differences $\Delta V1$ and $\Delta V2$ may be set according to voltage level values required due to boosting of a pixel voltage at a front end pixel area, and may be the same as voltage differences $\Delta V1'$ and $\Delta V2'$ of the ALS voltage Va according to the conventional art. The first gate-low voltage Vgl1 and the second gate-low voltage Vgl2 boost pixel voltage levels by $\Delta V1$ or $\Delta V2$ during a period when a TFT T of the pixel area at the front end is turned off.

Figure 6D:
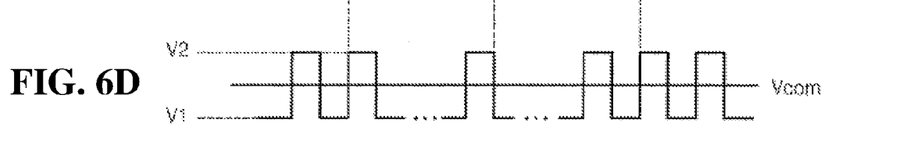

FIG. 6D is a timing diagram of a data voltage Vd that is applied to a data line according to an embodiment of the present invention. Referring to FIG. 6D, as a data voltage Vd, voltages V1 and V2 are reversed with respect to a common voltage Vcom having a direct current (DC) waveform at predetermined periods according to a driving frequency to be applied.

Figure 7:
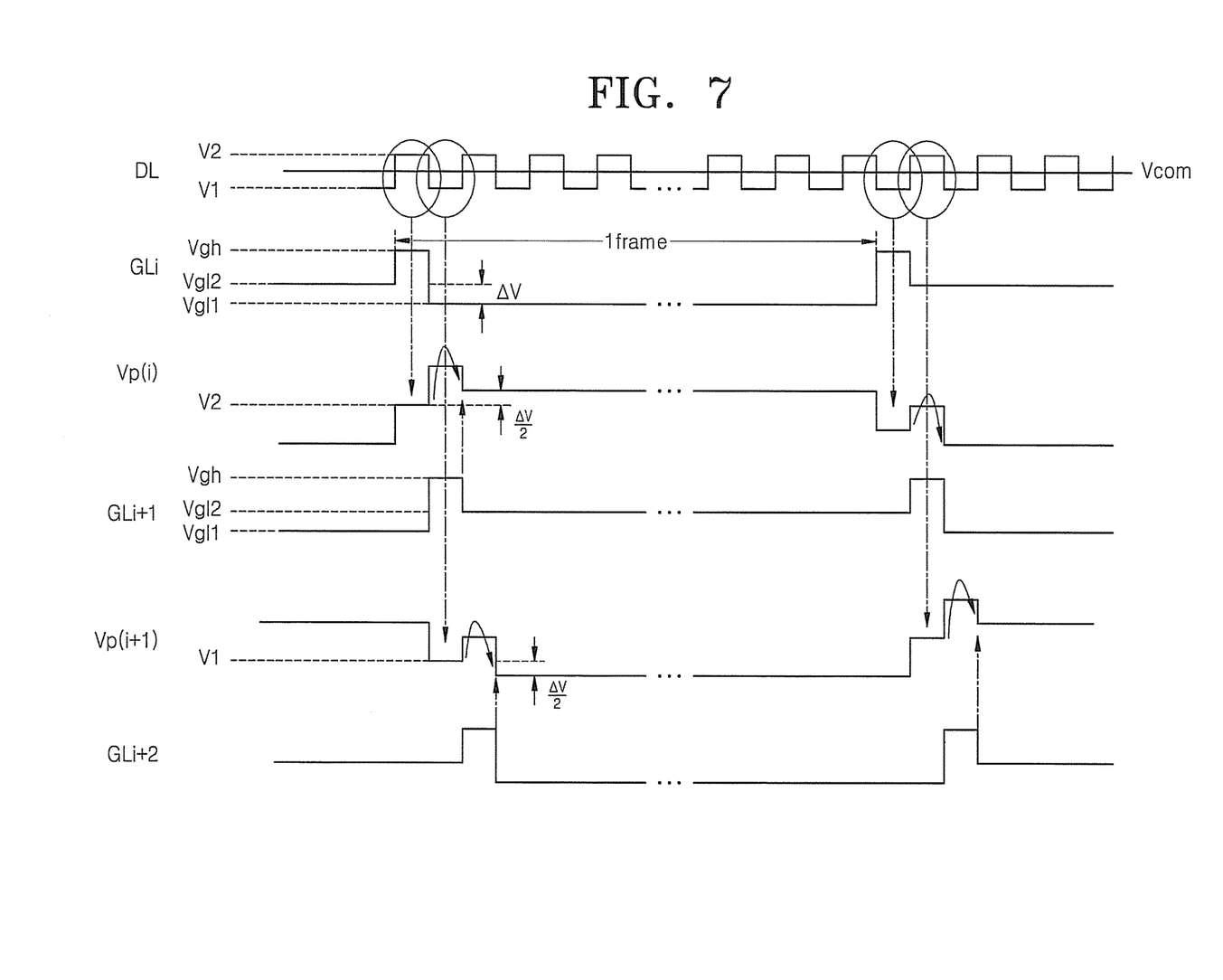
FIG. 7 is a timing diagram illustrating a variation in a pixel voltage according to voltages of a gate line and a data line, according to an embodiment of the present invention.

FIG. 7 is a timing diagram illustrating a variation in a pixel voltage according to voltages of a gate line and a data line, according to another embodiment of the present invention.

Referring to FIG. 7, a gate-high voltage Vgh and a gate-low voltage Vgl are applied as a gate voltage Vg to each gate line GL for each frame, and as the gate-low voltage Vgl, a first gate-low voltage Vgl1 and a second gate-low voltage Vgl2 are alternately input. Voltages V1 and V2 are reversed with respect to a common voltage Vcom to be input as a data voltage Vd. A voltage level of a pixel voltage of each pixel area is determined by the data voltage Vd and the gate-low voltage Vgl, the first gate-low voltage Vgl1 or the second gate-low voltage Vgl2, at a rear end pixel area.

First, when a gate-high voltage Vgh is applied to a gate electrode of the TFT T through an i-th gate line GLi, a TFT T of an i-th pixel area is turned on, and a data voltage Vd is applied to a pixel electrode of the i-th pixel area through a data line DL. The data voltage Vd is a voltage V2, and a pixel voltage Vp(i) of the i-th pixel area is also the voltage V2 as the data voltage Vd. When the gate-high voltage Vgh of the i-th pixel area is shifted to the gate-low voltage Vgl, the TFT T of the i-th pixel area is turned off. The first gate-low voltage Vgl1 is maintained as the gate-low voltage Vgl while the TFT T is turned off.

When the TFT T of the i-th pixel area is turned off, a gate-high voltage Vgh is applied to a gate electrode of a (i+1)-th gate line GLi+1 to turn on a TFT of a (i+1)-th pixel area, and a data voltage Vd is applied to a pixel electrode of the (i+1)-th pixel area. The data voltage Vd is a voltage V1, and a pixel voltage Vp of the (i+1)-th voltage is the same as the data voltage Vd, that is, the voltage V1. At the same time, a level of a pixel voltage Vp(i) of the i-th pixel area is increased by a predetermined level due to a gate-high voltage Vgh of the (i+1)-th gate line GLi+1. For example, the pixel voltage Vp(i) of the i-th pixel area may be increased by a half of the gate-high voltage Vgh, Vgh/2. When the level of the gate-high voltage Vgh of the (i+1)-th pixel area is shifted to a gate-low voltage Vgl, the TFT T of the (i+1)-th pixel area is turned off. The gate-low voltage Vgl maintains the second gate-low voltage Vgl2 while the TFT T of the (i+1)-th pixel is being turned off. The pixel voltage Vp(i) of the i-th pixel area maintains a voltage level that is boosted by a predetermined level, and may be boosted by ΔV2 as illustrated in FIG. 6C. Accordingly, for convenience of description, ΔV1 and ΔV2 are set to be the same (ΔV1=ΔV2), and a voltage level difference of the first gate-low voltage Vgl1 and the second gate-low voltage Vgl2 is set to be ΔV (ΔV1+ΔV2=ΔV). Accordingly, the pixel voltage Vp(i) of the i-th pixel area is boosted by a half of the voltage level difference ΔV, ΔV/2, between the first gate-low voltage Vgl1 and the second gate-low voltage Vgl2. Also, a pixel voltage Vp(i+1) of a (i+1)-th pixel area is increased by a predetermined level due to a gate-high voltage Vgh of a (i+2)-th gate line GLi+2, and then is boosted from a voltage V1 by a predetermined level, for example, by ΔV/2, due to the first gate-low voltage Vgl1 of the (i+2)-th gate line GLn+2.

Figure 8:
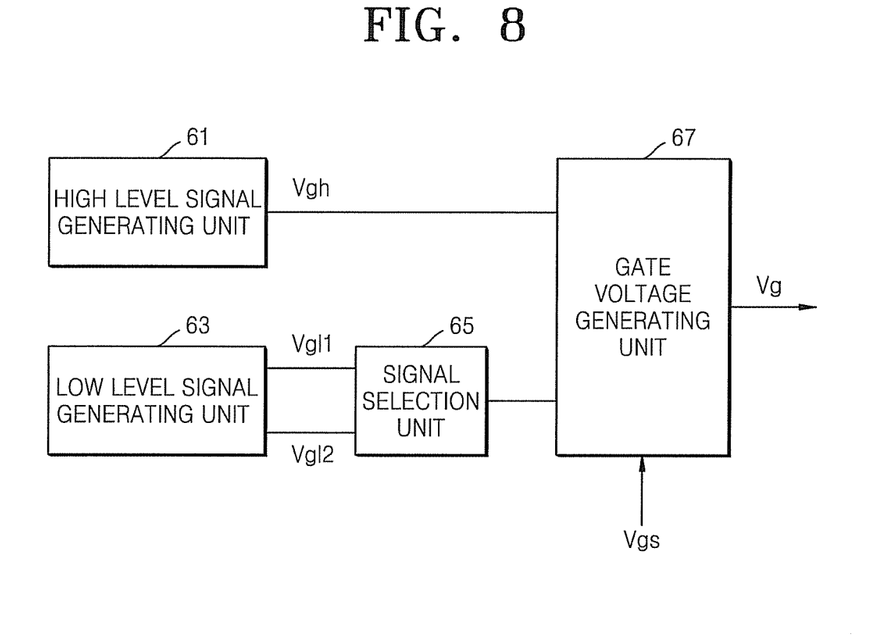
FIG. 8 is a block diagram illustrating a gate driving circuit of a gate driver, according to an embodiment of the present invention.

FIG. 8 is a block diagram illustrating a gate driving circuit of a gate driver according to an embodiment of the present invention.

Referring to FIG. 8, the gate driving circuit applies a predetermined pulse signal to a gate line of a liquid crystal panel according to a gate control signal Vgs, and includes a high level signal generating unit 61, a low level signal generating unit 63, a signal selection unit 65, and a gate voltage generating unit 67.

The high level signal generating unit 61 generates and outputs a gate-high voltage Vgh that turns on the TFT T.

The low level signal generating unit 63 generates and outputs a gate-low voltage Vgl that turns off the TFT T. The gate-low voltage Vgl generated by the low level signal generating unit 63 includes a first gate-low voltage Vgl1 and a second gate-low voltage Vgl2.

The signal selection unit 65 selects one of the first gate-low voltage Vgl1 and the second gate-low voltage Vgl2 output by the low level signal generating unit 63 and may include a multiplexer MUX.

The gate voltage generating unit 67 generates a gate on/off voltage for each frame according to a gate control signal Vgs from a shift register. The gate voltage generating unit 67 shifts the gate-high voltage Vgh and the first gate-low voltage Vgl1 or the second gate-low voltage Vgl1 and outputs the same.

The gate driving circuit may further include a buffer (not shown) that amplifies a current that is output from the gate voltage generating unit 67 considering a load of a gate line.

According to the display device of an aspect of the present invention, active level shift (ALS) lines and an ALS driver connected thereto are removed, and a capacitor is disposed between a pixel electrode at a current end and a gate line at a rear end to boost a pixel voltage. Accordingly, a pixel aperture ratio is increased and a width of an outer black matrix of a panel is reduced, thereby obtaining a slim outer black matrix.

Also, there is no need to additionally drive an ALS circuit, and thus the LCD device may be driven at low power consumption.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A display device comprising:
    a panel including a plurality of pixels connected to a plurality of data lines and a plurality of gate lines, each pixel comprising a switching device;
    a data driver that is connected to the plurality of data lines and configured to apply data signals having a first voltage level or a second voltage level which is lower than the first voltage level to the plurality of data lines; and
    a gate driver that is connected to the plurality of gate lines and configured to sequentially apply gate signals to the plurality of gate lines, the gate driver being configured to provide only one of a first gate-low voltage and a second gate-low voltage which is higher than the first gate-low voltage during an off period of each switching device,
    wherein the plurality of pixels comprise a first pixel and a second pixel that are connected to the same data line while the first pixel is connected to a first gate line and the second pixel is connected to a second gate line that is immediately next to the first gate line, the first pixel comprising a first switching device, the second pixel comprising a second switching device,
    wherein the gate driver is further configured to provide the first gate-low voltage to apply to the first pixel while providing the second gate-low voltage to apply to the second pixel in the same frame;
    wherein in a frame in which the data signal having the first voltage level is applied to the second pixel, in response to applying the first gate-low voltage to the second switching device, a pixel voltage of the first pixel is offset by a first constant value, and
    wherein in a frame in which the data signal having the second voltage level lower than the first voltage level is applied to the second pixel, in response to applying the second gate-low voltage higher than the first gate-low voltage to the second switching device, a pixel voltage of the first pixel is offset by a second constant value.

2. The display device of claim 1, wherein the first gate-low voltage and the second gate-low voltage boost a pixel voltage of a pixel connected to a previous gate line.

3. The display device of claim 2, wherein the first gate-low voltage and the second gate-low voltage boost the pixel voltage of the pixel connected to the previous gate line in an off period of the switching device.

4. The display device of claim 1, wherein the first gate-low voltage and the second gate-low voltage are alternately output for each frame.

5. The display device of claim 1, wherein the gate driver comprises a low level signal selection unit that selects one of the first gate-low voltage and the second gate-low voltage and outputs the selected gate-low voltage.

6. The display device of claim 5, wherein the low level signal selection unit is a multiplexer.

7. The display device of claim 1, wherein each pixel comprises:
   the switching device that is connected to one of the plurality of data lines and one of the plurality of gate lines;
   a pixel electrode that is connected to the switching device, wherein a portion of the pixel electrode overlaps with a next gate line;
   a liquid crystal capacitor that is formed between the pixel electrode and a common electrode facing the pixel electrode; and
   a storage capacitor that is formed between the pixel electrode and the next gate line.

8. The display device of claim 1, wherein the switching device is a thin film transistor (TFT).

9. The display device of claim 1, wherein the panel includes a single bank gate structure.

10. The display device of claim 1, wherein the panel includes a dual bank gate structure.

11. A display device comprising:
    a plurality of data lines supplying data signals to pixels and a plurality of gate lines supplying gate signals to the pixels of a panel, each pixel comprising:
    a TFT connected to a data line and a gate line;
    a pixel electrode that is connected to the TFT, wherein a portion of the pixel electrode overlaps with a next gate line;
    a liquid crystal capacitor that is formed between the pixel electrode and a common electrode facing the pixel electrode; and
    a storage capacitor that is formed between the pixel electrode and the next gate line,
    wherein the data line applies a data signal having a first voltage level or a second voltage level which is lower than the first voltage level,
    wherein the gate line applies only one of a first gate-low voltage and a second gate-low voltage which is higher than the first gate-low voltage during an off period of the TFT for each frame,
    wherein in a frame in which the data signal having the first voltage level is applied to a second pixel connected to an (n+1)-th gate line, in response to applying the first gate-low voltage to a TFT of the second pixel, a pixel voltage of a first pixel connected to an (n)-th gate line is boosted by a first constant value,
    wherein in a frame in which the data signal having the second voltage level lower than the first voltage level is applied to the second pixel, in response to applying the second gate-low voltage higher than the first gate-low voltage to the TFT of the second pixel, a pixel voltage of the first pixel is boosted by a second constant value,
    wherein the first pixel and the second pixel are connected to the same data line, and
    wherein the (n)-th gate line is configured to apply the first gate-low voltage to the first pixel while the (n+1)-th gate line applies the second gate-low voltage to the second pixel in the same frame.

12. The display device of claim 11, wherein the gate line applies a gate-high voltage to turn on the TFT, and applies a first gate-low voltage or a second gate-low voltage to turn off the TFT.

13. The display device of claim 12, further comprising:
    a gate driver that selects one of the first gate-low voltage and the second gate-low voltage and outputs the selected gate-low voltage.

14. The display device of claim 11, wherein a gate electrode of the TFT is connected to the gate line, and a first electrode of the TFT is connected to the data line, and a second electrode of the TFT is connected to the pixel electrode.

15. The display device of claim 11, wherein the panel includes a single bank gate structure.

16. The display device of claim 11, wherein the panel includes a dual bank gate structure.

17. The display device of claim 11, wherein the first gate-low voltage and the second gate-low voltage of the (n+1)-th gate line is applied to the storage capacitor of the first pixel connected to the (n)-th gate line.

* * * * *